United States Patent
Keal (10) Patent No.: US 9,207,099 B2
(45) Date of Patent: Dec. 8, 2015

(54) METHOD AND SYSTEM FOR ESTIMATING OFFSET IN ENVIRONMENTS WITH LIMITED MEMORY SPACE

(75) Inventor: William Kerry Keal, Santa Clara, CA (US)

(73) Assignee: INVENSENSE, INC., San Jose, CA (US)

(*) Notice: Subject to any disclaimer, the term of this patent is extended or adjusted under 35 U.S.C. 154(b) by 664 days.

(21) Appl. No.: 13/607,526

(22) Filed: Sep. 7, 2012

(65) Prior Publication Data

US 2014/0074420 A1    Mar. 13, 2014

(51) Int. Cl.
*G01C 25/00* (2006.01)
*G01D 18/00* (2006.01)

(52) U.S. Cl.
CPC ............ *G01C 25/005* (2013.01); *G01D 18/008* (2013.01)

(58) Field of Classification Search
CPC ..................................................... G01C 25/005
USPC ........................................................... 702/104
See application file for complete search history.

(56) References Cited

U.S. PATENT DOCUMENTS

| 4,185,251 A * | 1/1980 | Brown et al. ................. 330/279 |
| 2006/0030359 A1 * | 2/2006 | Behzad et al. ............. 455/556.1 |
| 2011/0246117 A1 * | 10/2011 | Moore ..................... G01K 7/42 702/99 |

* cited by examiner

*Primary Examiner* — Bryan Bui
(74) *Attorney, Agent, or Firm* — Sawyer Law Group, P.C.

(57) ABSTRACT

A computer implemented method, system and computer program product for estimating an offset of at least one sensor is disclosed. The computer implemented method, system and computer program product comprise calculating combinations of running sums to define for computing/or one or more slopes for the sensor. At least one of the one or more slopes provides an indication of the sensor offset changes with temperature.

12 Claims, 5 Drawing Sheets

METHOD AND SYSTEM FOR ESTIMATING OFFSET IN ENVIRONMENTS WITH LIMITED MEMORY SPACE

FIELD OF THE INVENTION

The present invention relates generally to sensor systems and more specifically to estimating an offset on sensor systems of a device as a function of temperature.

BACKGROUND

Sensor systems are utilized in a plurality of environments to determine the orientation of a device. The sensor systems can oftentimes include any combination of gyroscopes, accelerometers and magnetometers to provide the orientation information. It is known that an offset of a sensor can be estimated as a function of temperature. However traditionally the computation of offset estimation can require a significant amount of memory. Accordingly what is desired is a system and method that provides the offset estimation computation but uses significantly lees memory bandwidth than conventional solutions. The method and system should be simple, easily implemented and adaptable to existing environments. The present invention addresses such a need.

SUMMARY OF THE INVENTION

A computer implemented method, system and computer program product for estimating an offset of at least one sensor is disclosed. The computer implemented method, system and computer program product comprise calculating combinations of running sums to define for computing /or one or more slopes for the sensor. At least one of the one or more slopes provides an indication of the sensor offset changes with temperature.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENTS

The present invention relates generally to sensor systems and more specifically to estimating an offset on the sensor systems of a device as a function of temperature in such sensor systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides for temperature compensation via the estimation of an offset for motion sensors such as gyroscopes, accelerometers and magnetometers, when the sensors are used in environments where there is limited memory. Such environments include, for example, mobile devices such as, cell phones, tablet PCs, portable electronics and the like that are designed for mobility. Often the offset of sensors in such environments can be estimated as a function of temperature. The simplest function that can be used for the offset estimate is a line that represents a plurality of data points of temperature. To compute the best fit line, a history of the offset and corresponding temperatures must be recorded. Typically, keeping track of all the offsets and their corresponding temperatures utilizes a significant amount of the memory resources of the mobile device.

A system and method in accordance with the present invention provides for the estimation of an offset due to temperature that utilizes significantly less memory resources than known techniques. To describe the features of the offset estimation methodology refer now to the following description in conjunction with the accompanying figures.

Figure 1:
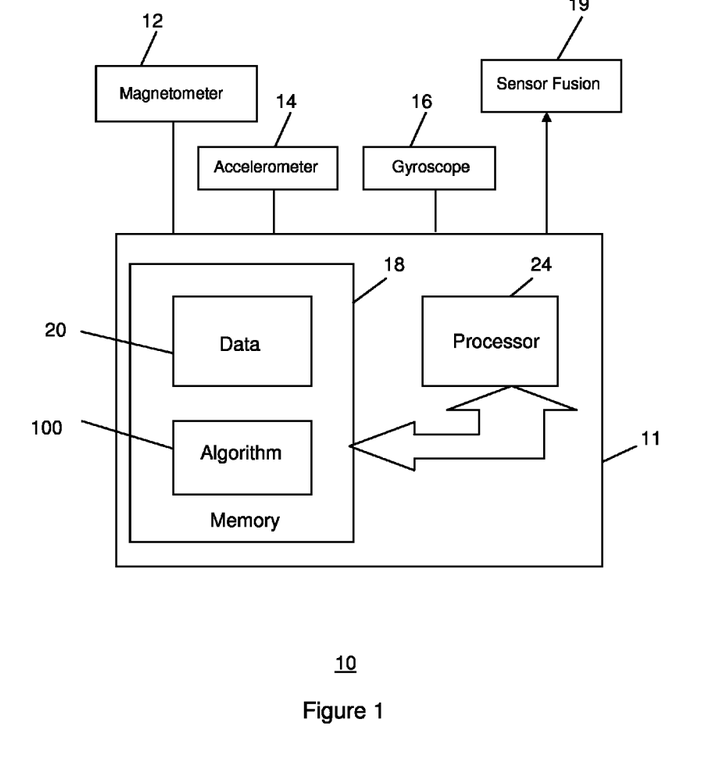
FIG. 1 is a block diagram of a system that utilizes an offset estimation algorithm in accordance with an embodiment.

FIG. 1 is a block diagram of a system that utilizes an offset estimation algorithm in accordance with an embodiment. FIG. 1 is a block diagram of a system 10 that utilizes an offset estimation algorithm 100 in accordance with an embodiment. The system 10 includes a device 11. The device 11 may include any type of mobile device including but not limited to, a cell phone, a tablet PC, or other type of portable electronic device. The device 11 receives input data from a plurality of sensors such as one or more magnetometers 12, one or more accelerometers 14 and one or more gyroscopes 16. Although the sensors 12, 14 and 16 are shown external to the device 11, one of ordinary skill in the art readily recognizes that those sensors could be internal to the device 11 and that would be within the spirit and scope of the present invention.

The device 11 includes memory 18 for storing data. Data 20 stores data from the magnetometer 12, the accelerometer 14 and the gyroscope 16. Memory 18 also includes an offset estimation algorithm 100 in accordance with the present invention. A processor 24 executes the algorithm 100 which operates on the data received from the sensors 12-16. The processor 24 provides the executed data to a sensor fusion 19. The sensor fusion 19 provides orientation information of the device.

A system and method in accordance with the present invention provides a temperature compensation mechanism which utilizes offset estimation for sensors such as gyroscopes, accelerometers and magnetometers, in devices that have limited memory. Often the offset for sensors can be estimated as a function of temperature. The simplest function that can be used estimate the offset is a line. To compute the best fit line a history of the offset and corresponding temperatures must be recorded. Keeping track of all of the offsets and corresponding temperatures utilizes a significant amount of memory. An offset estimation algorithm in accordance with the present invention estimates the offset in a manner that utilizes significantly less memory.

A system that utilizes an offset estimation algorithm in accordance with the present invention can take the form of an entirely hardware implementation, an entirely software implementation, or an implementation containing both hardware and software elements. In one implementation, the offset estimation algorithm is implemented in software, which includes, but is not limited to, application software, firmware, resident software, microcode, etc.

Furthermore, the offset estimation algorithm can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

An equation of a line representing a graph or chart of temperature versus offset can be expressed as:

$y = mx + b$, where m is the slope and b is the offset (y-intercept).

To compute the slope between 2 points (x1,y1) and (x2,y2) is simply:

$$\text{slope} = \frac{y2 - y1}{x2 - x1} \quad \text{Equation 1}$$

To compute the average slope over a set of points, the following equation can be used:

$$\text{slope} = \sum_{i=1}^{N-1} \sum_{j=i+1}^{N} \left[ \frac{(y_j - y_i)}{(x_j - x_i)} \right] \quad \text{Equation 2}$$

The temperature will be the x values in the equation and the offset will be the y values. All of the temperature and offset values are affected by noise. Instead of taking the average, a weighted average with weight factors based upon how far apart the points are in x (or temperature) is computed. Weighting by the distance in the x dimension gives the same answer as a minimum squared error through a set of points. More emphasis on the data points that are far apart is what is desired. Accordingly the distance to the third power along the x dimension is used. Using the distance leads to the equation:

$$\text{slope} = \frac{\sum_{i=1}^{N-1} \sum_{j=i+1}^{N} [(y_j - y_i) \cdot (x_j - x_i)^3]}{\sum_{i=1}^{N-1} \sum_{j=i+1}^{N} (x_j - x_i)^4} \quad \text{Equation 3}$$

The above equation is still difficult to compute, so next the identity is used:

$$\sum_{i=1}^{N-1} \sum_{j=i+1}^{N} [(b_j - b_i) \cdot (a_j - a_i)] = \left[ N \cdot \sum_{i=1}^{N} (b_i \cdot a_i) \right] - \left[ \sum_{i=1}^{N} (b_i) \right] \cdot \left[ \sum_{i=1}^{N} (a_i) \right] \quad \text{Equation 4}$$

Then the slope equation is rewritten such that the identity can be applied that is described Equation 4.

$$\text{slope} = \frac{\sum_{i=1}^{N-1} \sum_{j=i+1}^{N} \left[ [(x_j)^3 - (x_i)^3] \cdot (y_j - y_i) - 3 \cdot [(x_j \cdot y_j - x_i \cdot y_i) \cdot [(x_j)^2 - (x_i)^2]] + 3 \cdot [(x_i - x_j) \cdot [(x_i)^2 \cdot y_i - (x_j)^2 \cdot y_j]] \right]}{\sum_{i=1}^{N-1} \sum_{j=i+1}^{N} \left[ 4 \cdot (x_j - x_i) \cdot [(x_j)^3 - (x_i)^3] - 3[(x_j)^2 - (x_i)^2] \cdot [(x_j)^2 - (x_i)^2] \right]} \quad \text{Equation 5}$$

Applying the identity in Equation 4 to Equation 5 yields the following Equation 6:

$$\text{slope} = \frac{\left[ N \cdot \sum_{i=1}^{N} [(x_i)^3 \cdot y_i] \right] - \left[ \sum_{i=1}^{N} (x_i)^3 \right] \cdot \left[ \sum_{i=1}^{N} (y_i) \right] - 3 \cdot \left[ \left[ N \cdot \sum_{i=1}^{N} [(x_i)^3 \cdot y_i] \right] - \left[ \sum_{i=1}^{N} (x_i)^2 \right] \cdot \left[ \sum_{i=1}^{N} (x_i \cdot y_i) \right] \right] + 3 \cdot \left[ \left[ N \cdot \sum_{i=1}^{N} [(x_i)^3 \cdot y_i] \right] - \left( \sum_{i=1}^{N} x_i \right) \cdot \left[ \sum_{i=1}^{N} [(x_i)^2 \cdot y_i] \right] \right]}{4 \left[ N \cdot \sum_{i=1}^{N} [(x_i)^3 x_i] \right] - \left[ \sum_{i=1}^{N} (x_i)^3 \right] \cdot \left[ \sum_{i=1}^{N} (x_i) \right] - 3 \cdot \left[ \left[ N \cdot \sum_{i=1}^{N} (x_i)^4 \right] - \left[ \sum_{i=1}^{N} (x_i)^3 \right] \cdot \left[ \sum_{i=1}^{N} (x_i)^2 \right] \right]} \quad \text{Equation 6}$$

Next, equation 6 is simplified to provide equation 7 below:

$$\text{slope} = \frac{3 \cdot \sum_{i=1}^{N} (x_i \cdot y_i) \cdot \sum_{i=1}^{N} (x_i)^2 - 3 \cdot \sum_{i=1}^{N} x_i \cdot \sum_{i=1}^{N} [(x_i)^2 \cdot y_i] - \sum_{i=1}^{N} y_i \cdot \sum_{i=1}^{N} (x_i)^3 + N \cdot \sum_{i=1}^{N} [(x_i)^3 \cdot y_i]}{3 \cdot \left[ \sum_{i=1}^{N} (x_i)^2 \right]^2 - 4 \cdot \sum_{i=1}^{N} x_i \cdot \sum_{i=1}^{N} (x_i)^3 + N \cdot \sum_{i=1}^{N} (x_i)^4} \quad \text{Equation 7}$$

Equation 7 is written in a manner that provides for the calculation of eight running sums ($x_i y_i$, $x_i^2$, $x_i$, $x_i^2 y_i$, $y_i$, $x_i^3$, $x_i^3 y_i$, $x_i^4$). As a result, it is not necessary to have to keep track of the past values. The eight running sums and N are updated with each new set of points that are utilized to fit to a curve or line. To avoid overflow and loss of sensitivity all of the running sums can be divided by a factor and also the number of points, N, can be divided by the same factor. The division can be based upon threshold for the sums or number of points and/or based upon reaching a particular spread of values. In addition it may be beneficial to keep track of the maximum and minimum temperature range. The curve fit can only be used if the temperature is within a particular range.

The y-intercept for the line still needs to be computed. Given 2 points (x1,y1) and (x2,y2) the y-intercept would be:

$$\frac{(y1 \cdot x2 - x1 \cdot y2)}{(x2 - x1)} \quad \text{Equation 8}$$

To compute the average y-intercept for a range of points, the following Equation 9 would be used:

$$\text{intercept} = \frac{\sum_{i=1}^{N-1} \sum_{j=i+1}^{N} (y_i \cdot x_j - x_i \cdot y_j)}{\sum_{i=1}^{N-1} \sum_{j=i+1}^{N} (x_j - x_i)} \quad \text{Equation 9}$$

As was done for the slope, the $3^{rd}$ power of the distance along the x-axis needs to be weighted. The following Equation 10 results:

$$\text{intercept} = \frac{\sum_{i=1}^{N-1} \sum_{j=i+1}^{N} [(y_i \cdot x_j - x_i \cdot y_j) \cdot (x_j - x_i)^3]}{\sum_{i=1}^{N-1} \sum_{j=i+1}^{N} (x_j - x_i)^4} \quad \text{Equation 10}$$

Which can be rewritten as Equation 1

$$\text{intercept} = \frac{\sum_{i=1}^{N-1} \sum_{j=i+1}^{N} \begin{bmatrix} 3 \cdot [x_j \cdot y_j - x_i \cdot y_i] \cdot [(x_j)^3 - (x_i)^3] + \\ [(x_j)^3 \cdot y_j - (x_i)^3 \cdot y_i] \cdot (x_j - x_i) - 3 \cdot \\ [(x_j)^2 \cdot y_j - (x_i)^2 \cdot y_i] \cdot [(x_j)^2 - (x_i)^2] - \\ (y_i - y_j) \cdot [(x_i)^4 - (x_j)^4] \end{bmatrix}}{\sum_{i=1}^{N-1} \sum_{j=i+1}^{N} \begin{bmatrix} 4 \cdot (x_j - x_i) \cdot [(x_j)^3 - (x_i)^3] - \\ 3[(x_j)^2 - (x_i)^2] \cdot [(x_j)^2 - (x_i)^2] \end{bmatrix}} \quad \text{Equation 11}$$

The double sum identity above in Equation 4 is applied to Equation 11 for the following results:

$$\text{intercept} = \quad \text{Equation 12}$$

$$\frac{\begin{matrix} 3 \cdot \left[\left[N \cdot \sum_{i=1}^{N} \lceil (x_i)^4 \cdot y_i \rceil\right] - \left[\sum_{i=1}^{N} (x_i)^3\right] \cdot \left[\sum_{i=1}^{N} (x_i \cdot y_i)\right]\right] + \\ \left[\left[N \cdot \sum_{i=1}^{N} \lceil (x_i)^4 \cdot y_i \rceil\right] - \left[\sum_{i=1}^{N} x_i\right] \cdot \left[\sum_{i=1}^{N} \lceil (x_i)^3 \cdot y_i \rceil\right]\right] - \\ 3 \cdot \left[\left[N \cdot \sum_{i=1}^{N} \lceil (x_i)^4 \cdot y_i \rceil\right] - \left[\sum_{i=1}^{N} (x_i)^2\right] \cdot \left[\sum_{i=1}^{N} \lceil (x_i)^2 \cdot y_i \rceil\right]\right] - \\ \left[\left[N \cdot \sum_{i=1}^{N} \lceil (x_i)^4 \cdot y_i \rceil\right] - \left[\sum_{i=1}^{N} (x_i)^4\right] \cdot \left[\sum_{i=1}^{N} y_i\right]\right] \end{matrix}}{\begin{matrix} \left[4 \left[N \cdot \sum_{i=1}^{N} [(x_i)^3 \cdot x_i]\right] - \left[\sum_{i=1}^{N} (x_i)^3\right] \cdot \left[\sum_{i=1}^{N} (x_i)\right]\right] - \\ 3 \cdot \left[\left[N \cdot \sum_{i=1}^{N} (x_i)^4\right] - \left[\sum_{i=1}^{N} (x_i)^3\right] \cdot \left[\sum_{i=1}^{N} (x_i)^2\right]\right] \end{matrix}}$$

Which reduces to:

$$\text{intercept} = \frac{\sum_{i=1}^{N} y_i \cdot \sum_{i=1}^{N} (x_i)^4 - \sum_{i=1}^{N} x_i \cdot \sum_{i=1}^{N} [(x_i)^3 \cdot y_i] - 3 \cdot \sum_{i=1}^{N} (x_i \cdot y_i) \cdot \sum_{i=1}^{N} (x_i)^3 + 3 \cdot \sum_{i=1}^{N} [(x_i)^2 \cdot y_i] \cdot \sum_{i=1}^{N} (x_i)^2}{3 \cdot \left[\sum_{i=1}^{N} (x_i)^2\right]^2 - 4 \cdot \sum_{i=1}^{N} x_i \cdot \sum_{i=1}^{N} (x_i)^3 + N \cdot \sum_{i=1}^{N} (x_i)^4} \quad \text{Equation 13}$$

Figure 2:
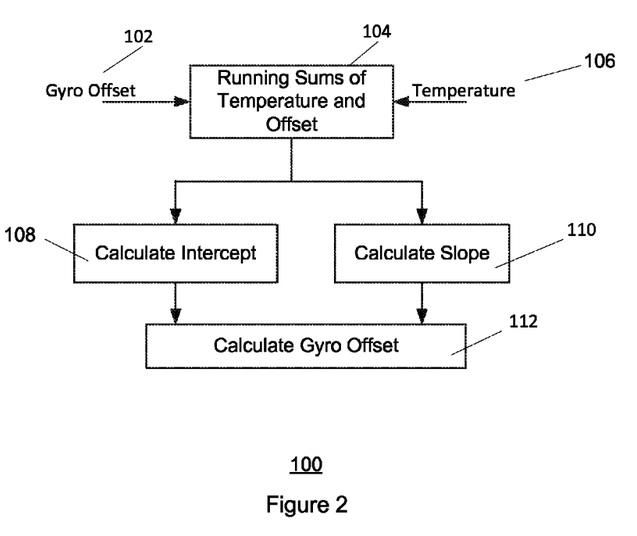
FIG. 2 is a flow chart that illustrates utilizing the offset with the temperature in accordance with the present invention.

FIG. 2 is a simple flow chart that illustrates calculating gyroscope offset in accordance with an embodiment. First, running sums of temperature 106 and offset 102 are provided, via step 104. In an embodiment, the running sum of the slope is calculated via step 110. In another embodiment, the running sum of the intercept is calculated via step 108. Step 108 may be optional. The gyroscope offset is calculated utilizing the calculated slope and/or intercept, via step 112. To describe the calculation of the gyroscope offset in more detail refer now to the following description in conjunction with the accompanying figures.

Figure 3:
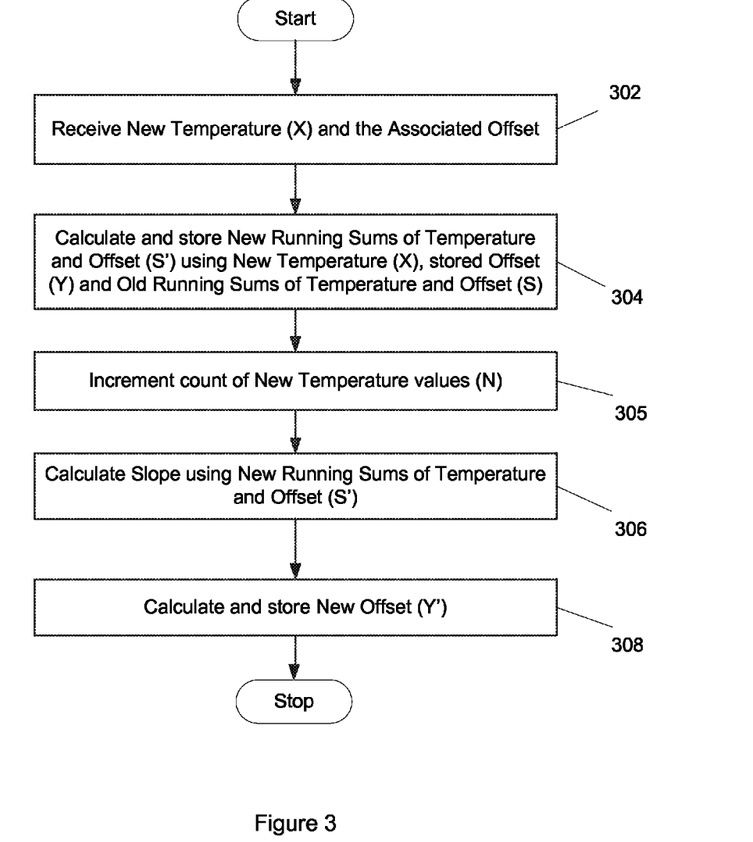
FIG. 3 is a flow chart that illustrates the offset estimation process in accordance with the present invention.

FIG. 3 is a flow chart that illustrates the offset estimation process in accordance with the present invention. First, a new temperature (X) and its associated offset are received, via step 302. Then, new running sums of temperature and offset (S') are calculated using the new temperature (X), stored offset (Y) and old running sums of temperature and offset (S), via step 304. Next, a count of new temperature values (N) is incremented, via step 305. Then, one or more slopes are calculated using the new running sums of temperature and offset (S'), via step 306. Thereafter, a new offset (Y') is calculated and stored, via step 308. In addition to calculating one or more slopes, it is important in some circumstances to also calculate one or more intercepts to provide a more accurate offset value estimation.

Implementation

Figure 4A:
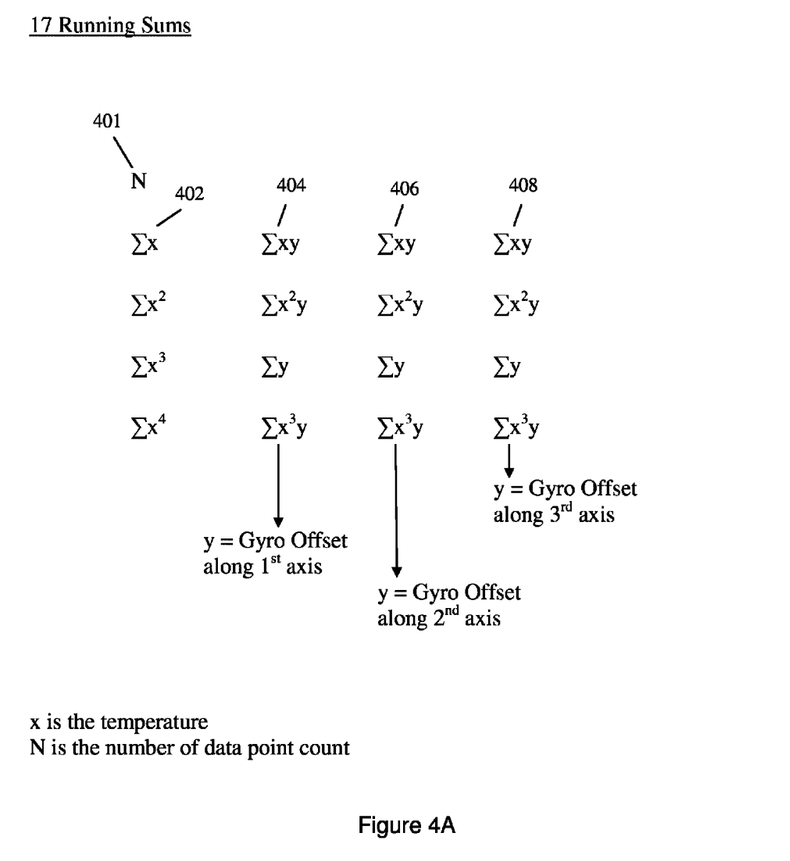
FIG. 4A illustrates the variables to be utilized for offset estimation for a three element gyroscope.

With the calculations defined in FIG. 3, implementation details can now be carried out. FIG. 4A illustrates the variables to be utilized for offset estimation for a three element gyroscope. For example, given a three element gyroscope offset and a temperature, the temperature would be the x variable, and the gyroscope offset would be the y variable in each of the three axes. FIG. 4A illustrates running sums to be calculated: for N 401 which is the number of data points, for a first column 402 which represents temperature, for a second column 404 which represent the temperature and the gyroscope offset along a first axis (x); for a third column 406 which represent the temperature and the gyroscope offset along a second axis (y); and for a fourth column 408 which represent the running sum for temperature and the gyroscope offset along a third axis (z). Therefore for each access, running sums are calculated for a total of 17 variables. The equation for slope and intercept can be applied after N is 2 or ore.

It may be desired to limit the value of N for numerical stability. One embodiment would be to limit N to 3000, and after N reaches 3000, then all the running sums and the counter N, are multiplied by 0.9. Scaling by 0.9 has an effect of weighting new data more and to prevent numerical stability issues that may arise if the running sums to continue to grow. Another method to limit the effect of numerical stability would be to make sure the temperature has changed by a minimum amount since the last data storage. A change of 1 or 2 degrees Celsius should be sufficient before adding the data to the data set of running sums. Storing the previous temperature would require 1 more persistent data storage variable.

To use the results to perform temperature compensation, the temperature is measured. Then the gyroscope would be corrected by subtracting out the estimated offset, where slope and intercept is determined by the math with the running sums in it above.

$$\text{Gyro\_Corrected} = \text{Gyro\_Measured} - \text{Slope} * \text{Temperature} - \text{Intercept}$$

Extension to Piece-Wise Linear

Figure 4B:
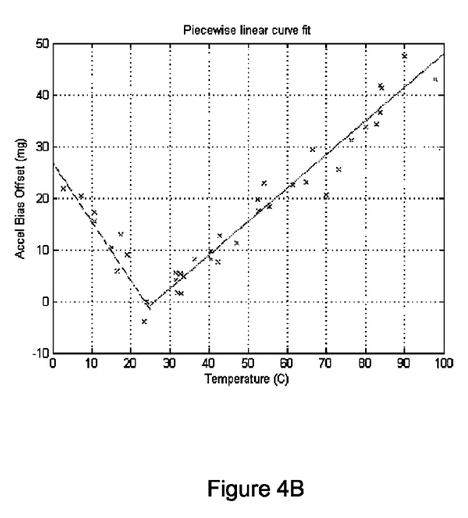
FIG. 4B shows a plot of the data, and the resulting curve fit.

The core algorithm can be extended for piecewise linear. For this embodiment, an accelerometer is considered where a piecewise linear fit is done where the piecewise breakpoint is at 25 degrees C. FIG. 4B shows a plot of the data, and the resulting curve fit.

Just as above, for the gyroscope example embodiment, where 17 running sums and 1 count of the number of terms for 3 axes were stored, a similar method can also be used to reduce the number of terms to store. However, because 2 pieces are required for a linear fit the number of terms would double to 34 terms. If the temperature is forced to move by a set amount such as at least 1 or 2 degrees C. then 35 persistent storage terms would be needed for a 2 piecewise term and 3 axes. When storing the data, for this embodiment, if the temperature was above 25 C, then the data would be applied to one set of running sums and number of data points. If the temperature was below 25 C, then the data would be applied to the other set of running sums and number of data points.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for correcting a measurement of at least one sensor by estimating an offset of the at least one sensor, the method comprises:
    calculating combinations of running sums of temperature that are received from a temperature sensor and an associated offset that is derived from data received from the at least one sensor to compute one or more slopes for the at least one sensor, wherein the one or more slopes indicates how the estimated offset of the at least one sensor changes with temperature; wherein the calculating includes computing an average slope for a set of data from the at least one sensor that contains a fourth order equation of the distance along a temperature axis for all combination of pairs of points by using running sums of various powers of the data; and wherein the estimated offset is subtracted from the measurement of the at least one sensor to provide a corrected measurement by the at least one sensor.

2. The method of claim 1, wherein the calculating includes computing one or more intercepts for the at least one sensor, wherein the one or more intercepts provides an indication of how the offset of the at least one sensor changes with temperature.

3. The method of claim 2, wherein sensor data that are further apart in temperature are given more weight to improve accuracy.

4. The method of claim 1, which includes providing a piecewise linear fit of the data to improve accuracy, wherein the piecewise breakpoint is at a predetermined temperature.

5. A device comprising:
    a processor;
    at least one sensor for providing data; and
    a memory coupled to the processor; wherein the memory receives the data from the at least one sensor; wherein the memory includes an algorithm for estimating an offset of the at least one sensor; wherein the processor executes the algorithm to perform the following operations; calculating combinations of running sums of temperature that are received from a temperature sensor and an associated offset that is derived from data received from the at least one sensor to compute one or more slopes for the at least one sensor, wherein the one or more slopes indicates how the estimated offset of the at least one sensor changes with temperature; wherein the calculating includes computing an average slope for a set of data from the at least one sensor that contains a fourth order equation of the distance along a temperature axis for all combination of pairs of points by using running sums of various powers of the data; and wherein the estimated offset is subtracted from the measurement of the at least one sensor to provide a corrected measurement by the at least one sensor.

6. The device of claim 5, wherein the calculating includes computing one or more intercepts for the at least one sensor, wherein the one or more intercepts provides an indication of how the offset of the at least one sensor changes with temperature.

7. The device of claim 6, wherein sensor data that are further apart in temperature are given more weight to improve accuracy.

8. The device of claim 5, which includes providing a piecewise linear fit of the data to improve accuracy, wherein the piecewise breakpoint is at a predetermined temperature.

9. A computer program product including non-transitory program instructions for estimating an offset of at least one sensor, the program instructions being executed by a computer for performing the following operations:
    calculating combinations of running sums of temperature that are received from a temperature sensor and an associated offset that is derived from data received from the at least one sensor to compute one or more slopes for the at least one sensor, wherein the one or more slopes indicates how the estimated offset of the at least one sensor changes with temperature; wherein the calculating includes computing an average slope for a set of data from the at least one sensor that contains a fourth order equation of the distance along a temperature axis for all combination of pairs of points by using running sums of various powers of the data; and wherein the estimated offset is subtracted from the measurement of the at least one sensor to provide a corrected measurement by the at least one sensor.

10. The computer program product of claim 9, wherein the calculating includes computing one or more intercepts for the at least one sensor, wherein the one or more intercepts provides an indication of how the offset of the at least one sensor changes with temperature.

11. The computer program product of claim 10, wherein sensor data that are further apart in temperature are given more weight to improve accuracy.

12. The computer program product of claim 9, which includes providing a piecewise linear fit of the data to improve accuracy, wherein the piecewise breakpoint is at a predetermined temperature.

* * * * *